Sept. 19, 1961          A. N. STANTON          3,001,013

OPTICAL TRANSLATING SYSTEM

Filed Aug. 4, 1955

Austin N. Stanton
INVENTOR

BY    *Wm. T. Wofford*

ATTORNEY

United States Patent Office 3,001,013
Patented Sept. 19, 1961

3,001,013
OPTICAL TRANSLATING SYSTEM
Austin N. Stanton, P.O. Box 638, Garland, Tex.
Filed Aug. 4, 1955, Ser. No. 526,427
3 Claims. (Cl. 178—7.1)

My invention relates to photographic systems, and more particularly to systems for producing photographic representations of subjects without utilizing sensitized plates or films.

My invention is particularly applicable to aerial photography, though it is not limited thereto. Conventional aerial cameras employ a two-dimensional image. This image is then reduced photochemically to a visible picture. Increased demands for greater accuracy, speed, breadth of view, and increased operating altitudes in aerial photography have led to progressively larger and heavier cameras to the point where they tax the capacity of the aircraft expected to carry them. In addition, such cameras present the difficult logistic problem of supplying perishable photochemical supplies, and of course, require substantial dark-room facilities. Also, if the aircraft is lost, so is the photographic information. Further, the supply of film in the camera is somewhat limited, and reloading in the air is difficult, and under some conditions, impossible. Lastly, the photographic information may not be utilized until the aircraft returns to base and the film is developed.

It is accordingly a general object of my invention to provide a photographic system which will obviate the disadvantages aforementioned.

More specifically, it is an object of my invention to provide an effective photographic system which does not involve photochemistry and the attendant disadvantages thereof.

Another object of my invention is to provide an effective photographic system which does not utilize sensitized plates or films.

Another object of my invention is to provide a system for aerial photography wherein the photographic information may be transmitted to a ground receiving station prior to conversion to picture form.

Another object of my invention is to provide a system for aerial photography which can be made considerably smaller and lighter than systems heretofore available for similar purposes.

Another object of my invention is to provide a system for aerial photography which shall require less costly and less elaborate lenses than those utilized in equipment heretofore available for similar purposes.

Another object of my invention is to provide a system for aerial photography which does not require use of perishable photochemical supplies.

Another object of my invention is to provide a system to translate image representations into electrical energy or signals.

These and other objects are effected by my invention as will be apparent from the following description taken in accordance with the accompanying drawing, forming a part of this application, in which.

The principles of my invention may be best understood when discussed in connection with aerial photography.

In accordance with the invention, an image of a narrow strip of terrain transverse to the direction of motion of an aircraft may be focused on a narrow slit similarly disposed. A scanning device is employed to traverse the slit and with cooperation of other equipment, intensity variations along the length of the slit are converted into electrical signals to be recorded, for example on magnetic tape or wire, or to be transmitted to a receiver outside the aircraft. The electric signals, either directly or from recordings, may be utilized to make up a picture by means similar to the telephoto printer, or facsimile receiver.

Figure 1:
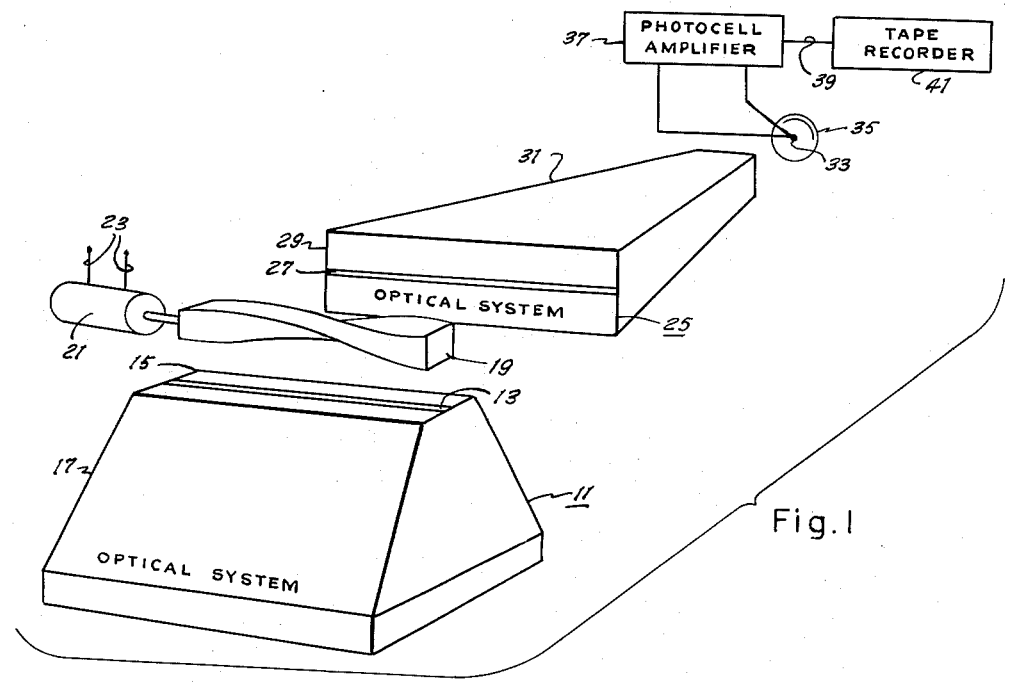
FIGURE 1 is a schematic diagram showing a preferred embodiment of my invention.

Referring now to FIGURE 1, a first optical system 11 serves to focus an image of a narrow strip of terrain on a slit 13 in a mask 15 located at the top end of the optical system closure 17. A scanning device 19 takes the form of a slender rod having rectangular transverse section, with each of four faces twisted uniformly along its length one quarter revolution. Each face of the scanning device is a reflecting surface. The scanning device 19 is centrally disposed immediately above the slit 13 with its longitudinal axis parallel to the slit 13. The scanning device 19 is driven by an electric motor 21 which is supplied power via leads 23 from a source not shown. A second optical system 25 is disposed substantially at right angles to the first and spaced from said scanning device 19. A slit 27 in a mask 29 which serves as the front face of the closure 31 for second optical system 25 is disposed parallel to the longitudinal axis of the scanning device 19. The second optical system 25 serves to focus intensity variations impinging on the slit 27 to a focal point 33 located outside the closure of the second optical system. A photocell 35 is located at the focal point 33 of the second optical system 25. The photocell output is fed to an amplifier 37 which has its output connected via a lead 39 to a tape recorder 41.

In operation, the first optical system 11, being moved continuously across the face of the subject, views the subject to be photographed a strip at a time. In aerial photography, the aircraft flies a straight course at constant speed and altitude, and the first optical system 11 views progressive strips of terrain transverse to the aircraft's path of flight. The first optical system 11 forms an image of each successive strip on the slit 13. Intensity variations representative of the characteristics of the subject for one substantially unidimensional strip are presented by the optical system to the slit 13. The scanning device 19 scans the slit 13 once each quarter revolution. Intensity variations emanating from the slit 13 are reflected by the scanning device. The reflections from one face of the scanning device at a particular instant take the general shape of a spiral fan segment. In other words, the reflected beam is never parallel to the slit 27 of the second optical system closure, and only a spot of the beam passes the slit 27 at any given instant, though the spot progresses along the slit as the scanning device 19 rotates. The speed of rotation of the scanner must of course be properly related to the speed of the aircraft and the degree of detail desired on the final product; that is, the number of lines per unit length of finished photograph.

Let us say for purpose of explanation that a finished photograph is composed of scan lines having a density of about 520 per inch, as in some television systems. Then the scanning device 19, having four faces, would need to rotate 130 revolutions for every inch of final photograph. Each line of the photograph would correspond to a quarter revolution of the scanning device. Also, each line would in turn consist of the incremental varying intensity signals transmitted through the slit 27 of the second optical system 25 during one quarter revolution of the scanning device. The essence of the function of the scanning device 19 is that it breaks the image which is present on the slit 13 of the first optical system 11 at a given instant up into a train of incremental intensity variations, which are focused by the second optical system 25 to a spot, at which spot is located a device for converting the intensity variations into electrical signals, which in the case of FIGURE 1, are amplified and fed to a tape recorder.

Figures 2, 3:
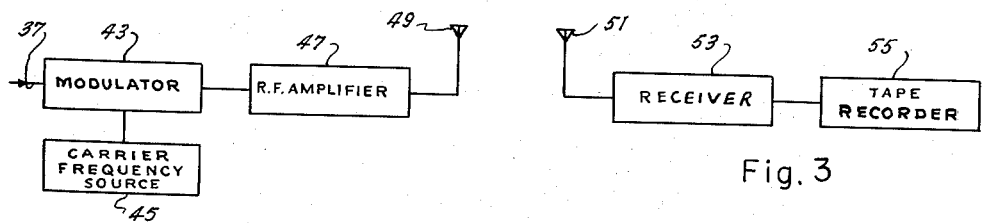
FIGURES 2 and 3 are schematic diagrams which, when taken with a portion of FIGURE 1, form another embodiment of the invention.
Figure 4:
FIGURE 4 is a schematic diagram which, when taken with FIGURE 2 and a portion of FIGURE 1, form another embodiment of my invention.
Figure 5:
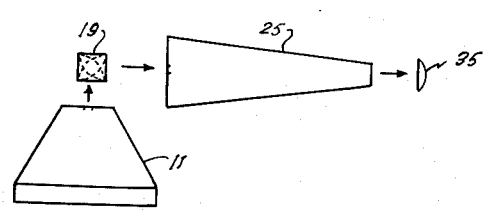
FIGURE 5 is a side elevational view of part of the apparatus of FIGURE 1.

FIGURE 2 shows in block form, a modulator 43, fed by a carrier frequency source 45, and also by signals from lead 39 which is also the output of the photocell amplifier. The modulator output feeds an R.F. amplifier 47 which feeds an antenna 49. FIGURE 3 shows an antenna 41 feeding a receiver 53, which in turn feeds a tape recorder 55. It is apparent that with the systems shown by FIGS. 2 and 3, the picture information may be readily transmitted from the pick-up location via radio (or wire if desired) to a remote location where it may be recorded. FIG. 4 shows an antenna 57 feeding a facsimile receiver 59, which of course, suggests that the picture information may be transmitted and converted directly to picture form without recording.

The foregoing disclosure and the showings made in the drawings are merely illustrative of the principles of this invention, and are not to be interpreted in a limiting sense. Although the system discussed herein is suited for a photographic medium in the form of visible light, yet other media could be used, as for example infra red, or electromagnetic wave energy, without departing from the principles of the invention. It may be desirable under some conditions to make the scanning device of the type shown with more than four reflecting surfaces, changing the amount of curvature, or twist, accordingly. Other types of scanning systems may also be employed to perform the same functions. Further the disposition of the second optical system may be varied, as will be apparent to those skilled in the art.

I claim:

1. A system for translating image representations into electrical energy comprising a first optical device for receiving images and having a focal means and a slit arranged to present a longitudinal view of a subject, a second optical device having a focal means and a slit, scanning means arranged between said two optical devices to transfer the light intensity variations of an image representation from said first optical device to said second optical device, said scanning device being in the form of a rectangular rod having four reflecting continuous faces with each of the faces being twisted uniformly along the length of the bar one quarter revolution, means to rotate said scanning rod, and an electric sensing means associated with said second optical device to translate the light intensity variations into electrical energy.

2. A system for translating image representations into electrical energy comprising a first optical device for receiving images and having a focal means and slit arranged to present a longitudinal view of a subject, a second optical device having a focal means and a slit, said second optical device being positioned at right angles to said first optical device, a scanning means located between said two optical devices to transfer the light intensity variations of an image representation from said first optical device to said second optical device, said scanning device being in the form of a rectangular rod having four reflecting continuous faces with each of the faces being twisted uniformly along the length of the bar one quarter revolution, said rod having its axis parallel to the slits of the said optical devices, means to rotate said scanning rod, and an electric sensing means associated with said second optical device to translate the light intensity variations into electrical energy.

3. A system for translating image representations into electrical energy comprising, a first optical device having an enclosure with an open side to receive said images and an opposite side being masked to present a longitudinal slot, a second optical device having an enclosure with an open side and an opposite side being masked to present a longitudinal slot, a scanning device located between said two optical systems to transfer light intensities from one optical device to the other optical device, said scanning device being in the form of a rectangular rod having four reflecting continuous faces with each of the four faces being twisted uniformly along its length one quarter revolution, means to rotate said scanning rod, and an electrical sensing means positioned at the open side of said second optical device and at the focal point thereof to receive the light intensity variations and convert the same into electrical energy.

References Cited in the file of this patent

UNITED STATES PATENTS

| 1,753,697 | Gardner | Apr. 8, 1930 |
| 2,510,200 | Thompson | June 6, 1950 |
| 2,709,716 | Haller | May 31, 1955 |

FOREIGN PATENTS

| 539,740 | Great Britain | Sept. 23, 1941 |